US011975430B2

(12) United States Patent
Kloepfer et al.

(10) Patent No.: US 11,975,430 B2
(45) Date of Patent: May 7, 2024

(54) CLAMP AND METHOD FOR OPERATING A CLAMP

(71) Applicant: BESSEY Tool GmbH & Co. KG, Bietigheim-Bissingen (DE)

(72) Inventors: Gerhard Kloepfer, Pleidelsheim (DE); Thomas Klein, Besigheim (DE); Rainer Steinle, Denkendorf (DE)

(73) Assignee: BESSEY Tool GmbH & Co. KG, Bietigheim-Bissingen (DE)

( * ) Notice: Subject to any disclaimer, the term of this patent is extended or adjusted under 35 U.S.C. 154(b) by 0 days.

(21) Appl. No.: 17/823,533

(22) Filed: Aug. 31, 2022

(65) Prior Publication Data

US 2022/0410349 A1 Dec. 29, 2022

Related U.S. Application Data

(63) Continuation of application No. 16/708,779, filed on Dec. 10, 2019, now Pat. No. 11,541,512, which is a (Continued)

(30) Foreign Application Priority Data

Jun. 23, 2017 (DE) ..................... 10 2017 113 996.6

(51) Int. Cl.
*B25B 5/10* (2006.01)

(52) U.S. Cl.
CPC .................................... *B25B 5/102* (2013.01)

(58) Field of Classification Search
CPC .. B25B 5/102; B25B 5/06; B25B 5/02; B25B 5/068; B25B 5/16; B25B 5/127; (Continued)

(56) References Cited

U.S. PATENT DOCUMENTS 2,664,020 A * 12/1953 De Note .............. B25B 21/002 81/57.12
4,185,811 A 1/1980 Long
(Continued)

FOREIGN PATENT DOCUMENTS

CN 1146487 4/2004
CN 1611327 5/2005
(Continued)

*Primary Examiner* — Tyrone V Hall, Jr.
*Assistant Examiner* — Michael A Gump
(74) *Attorney, Agent, or Firm* — Lipsitz & McAllister, LLC

(57) ABSTRACT

A clamp, comprising a guide rail, a fixed jaw, which is arranged on the guide rail, a sliding jaw, which is displaceable on the guide rail, and at least one spindle, which is arranged displaceably on the sliding jaw and on which there is arranged or formed a pressure piece, with an actuation device, which is spaced from the at least one spindle and which actuable by an operator in order to control a displacement movement of the at least one spindle, with a force application device, which acts on the at least one spindle and by means of which a displacement movement of the at least one spindle is achievable, and with a transmission device, which connects the actuation device and the force application device.

24 Claims, 13 Drawing Sheets

Related U.S. Application Data continuation of application No. PCT/EP2018/066272, filed on Jun. 19, 2018.

(58) Field of Classification Search

CPC B25B 5/163; B25B 5/10; B25B 5/101; B25B 5/067; B25B 1/10; B25B 1/106; B25B 1/18; F16B 2/12

USPC .......... 29/559

See application file for complete search history.

(56) References Cited

U.S. PATENT DOCUMENTS

| | | | |
|---|---|---|---|
| 4,478,103 | A | 10/1984 | Benjamin |
| 4,753,427 | A | 6/1988 | Lodrick, Sr. |
| 4,770,401 | A * | 9/1988 | Donaldson .......... B25B 1/18 269/283 |
| 5,775,680 | A | 7/1998 | Sorenson et al. |
| 6,113,085 | A * | 9/2000 | Lindenthal .......... B25B 5/102 269/170 |
| 6,340,154 | B1 | 1/2002 | Young |
| 7,007,937 | B2 | 3/2006 | Foshag et al. |
| 8,033,536 | B2 | 10/2011 | Le Devehat |
| 9,889,543 | B2 | 2/2018 | Roesch et al. |
| 2005/0087918 | A1 | 4/2005 | Foshag et al. |
| 2005/0184439 | A1 | 8/2005 | Janson et al. |
| 2007/0138724 | A1 | 6/2007 | Gibbons et al. |
| 2007/0222130 | A1 | 9/2007 | Leinbach et al. |
| 2010/0187739 | A1 | 7/2010 | Klein et al. |
| 2014/0103595 | A1 * | 4/2014 | Yang .......... B25B 11/00 269/136 |
| 2014/0339753 | A1 | 11/2014 | Fukui et al. |
| 2016/0184978 | A1 | 6/2016 | Roesch et al. |
| 2016/0184979 | A1 | 6/2016 | Roesch et al. |
| 2016/0354888 | A1 * | 12/2016 | Huber .......... B25F 5/001 |

FOREIGN PATENT DOCUMENTS

| | | |
|---|---|---|
| CN | 1840291 | 10/2006 |
| CN | 100500384 | 6/2009 |
| CN | 100540227 | 9/2009 |
| CN | 102554819 | 7/2012 |
| CN | 202943546 | 5/2013 |
| CN | 103934764 | 7/2014 |
| CN | 105163910 | 12/2015 |
| CN | 205166727 | 4/2016 |
| DE | 7805148 | 8/1978 |
| DE | 8325882 | 11/1983 |
| DE | 102005021789 | 11/2006 |
| DE | 202013104638 | 12/2013 |
| GB | 1429968 | 3/1976 |
| TW | 197974 | 1/1993 |
| TW | 217392 | 12/1993 |
| TW | 397741 | 7/2000 |
| TW | 467811 | 12/2001 |
| TW | I233869 | 6/2005 |
| TW | 200911472 | 3/2009 |
| TW | 201008713 | 3/2010 |
| TW | 201414591 | 4/2014 |
| TW | 201414592 | 4/2014 |
| TW | I432294 | 4/2014 |
| TW | M489057 | 11/2014 |
| TW | M494063 | 1/2015 |
| TW | I490102 | 7/2015 |
| TW | I562868 | 12/2016 |
| WO | 9835790 | 8/1998 |
| WO | 0222312 | 3/2002 |
| WO | 2011018238 | 2/2011 |

* cited by examiner

CLAMP AND METHOD FOR OPERATING A CLAMP

This application is a continuation of commonly owned co-pending U.S. application Ser. No. 16/708,779 filed on Dec. 10, 2019, which is a continuation of international application number PCT/EP2018/066272 filed on Jun. 19, 2018 and claims the benefit of German application number 10 2017 113 996.6 filed on Jun. 23, 2017, which are incorporated herein by reference in their entirety and for all purposes.

BACKGROUND OF THE INVENTION

The invention relates to a clamp comprising a guide rail, a fixed jaw, which is arranged on the guide rail, a sliding jaw, which is displaceable on the guide rail, and at least one spindle, which is arranged on the sliding jaw so as to be displaceable and on which there is arranged or formed a pressure piece.

One or more workpieces can be clamped between the pressure piece and the fixed jaw using a clamp of this kind. The sliding jaw can be slid towards the one or more workpieces to be clamped, and an appropriate clamping force can be exerted by means of the spindle with the pressure piece.

Document DE 78 05 148 U1 discloses a quick-action clamp, consisting of a guide rod with head part and of a guide part, which can be displaced on the guide rod and together with the head part surrounds the parts to be clamped. The clamping device of the clamp has a clamping bolt mounted on the head part, which bolt can be pressed down by means of a cam that is arranged on the head part and that actuable by an operating lever.

A battery-operated clamp from the company Black & Decker is known under the name ACC100.

SUMMARY OF THE INVENTION

In accordance with an embodiment of the invention, a clamp is provided, which can be operated in a simple manner and in particular can be operated one-handed.

In accordance with an embodiment of the invention, an actuation device is provided which is spaced from the at least one spindle and which actuable by an operator in order to control a displacement movement of the at least one spindle, wherein a force application device is provided, which acts on the at least one spindle and by means of which a displacement movement of the at least one spindle is achievable, and wherein a transmission device is provided, which connects the actuation device and the force application device.

In accordance with an embodiment of the invention, the actuation device, which is operated by an operator, is spaced from the spindle. A spindle displacement is controlled by the actuation device, wherein the appropriate control commands are transmitted by means of the transmission device to the force application device for the displacement of the spindle.

The command transmission is in this case for example a signal transmission, or the corresponding mechanical forces and in particular torques can be transmitted by the transmission device from the actuation device to the force application device and from there to the spindle.

As a result of an embodiment of the invention it is possible that an operator holds the clamp with one hand and at the same time also uses this hand to perform a spindle displacement by means of the actuation device-transmission device-force application device chain of action. The operator then has the other hand free, for example in order to hold one or more workpieces.

Simple operation of the clamp and in particular one-handed operation is provided as a result.

It is favourable if the transmission device connects the actuation device and the force application device to one another in signal-transmitting manner and/or in force-transmitting manner and in particular torque-transmitting manner. In the case of a connection such that signals can be exchanged, the actuation device provides signals which are transmitted from the transmission device to the force application device. These signals are then control signals for the force application device for displacement of the spindle. In the case of a (mechanical) connection such that forces and in particular torque can be transmitted, mechanical forces are transmitted from the actuation device to the force application device by the transmission device. In particular, the application of force necessary for displacement of the spindle is introduced by an operator by means of the actuation device and is then forwarded by means of the transmission device.

The transmission device makes it possible to provide a physical space between the actuation control unit of the at least one spindle and the spindle itself, in particular so as to provide the possibility for one-handed operation.

It is favourable if the actuation device is arranged on a sliding jaw and in particular is displaceable therewith. This results in simple handling and in particular one-handed operation of the clamp.

In one embodiment, the sliding jaw comprises a housing with a housing interior, with the force application device and the transmission device being arranged at least in part in the housing interior. These can thus be positioned in a protected manner. A compact structure results.

In particular, the housing is closed. It is closed for example by a housing cover. The housing cover for example can also form one or more bearings (for example for the force application device, or the actuation device), and in particular slide bearings.

It is very particularly advantageous if the at least one spindle is mounted rotatably on the sliding jaw. A displacement movement can thus be achieved in a simple manner by means of a rotary movement.

It is then particularly advantageous if the at least one spindle is a screw spindle which is mounted rotatably by means of a thread on a counter thread of the sliding jaw. By means of a rotary movement of the at least one spindle, a displacement movement of this spindle can then be realised, wherein in particular a direction of rotation of the at least one spindle determines whether the spindle is displaced in the direction of the fixed jaw or away therefrom.

In an advantageous exemplary embodiment a first guide device for guiding the sliding jaw on the guide rail is arranged on the sliding jaw, and a second guide device for guiding the at least one spindle on the sliding jaw is arranged on the sliding jaw, wherein in particular the first guide device and the second guide device are spaced from one another. A corresponding compact clamp which can be easily operated can thus be realised in a simple manner.

It is favourable if a direction of displacement of the displaceability of the sliding jaw on the guide rail and a direction of displacement of the displaceability of the at least one spindle and a sliding jaw are parallel to one another. This results in a compact structure with simple operability.

In particular one-handed operation is provided, in which case a displacement movement of the at least one spindle can be brought about in a manner controlled by means of the actuation device by means of a holding hand of the operator, by means of which the clamp is held. The operator's other hand is thus free, for example so as to hold one or more workpieces.

In the case of an embodiment that is favourable in terms of its construction, the actuation device is a rotary handle or comprises such a handle, wherein a displacement of the at least one spindle actuable by means of a rotation of the rotary handle. This results in a compact structure. The rotary handle can be configured at the same time as a handgrip for the clamp as a whole. The rotary handle can also be configured such that a displacement movement of the sliding jaw (by pushing or pulling) on the guide rail can also be brought about by means of said handle. Here, it is possible for example that a torque is introduced by means of the rotary handle, which torque is then transmitted by means of the transmission device and the force application device to the at least one spindle. It is also possible for example that the rotary handle forms a type of switch, wherein corresponding signals are generated depending on the position of the rotary handle, which then control the force application device so as to bring about a displacement movement of the at least one spindle.

It is favourable if the rotary handle is mounted rotatably on the sliding jaw. This results in a compact structure. The rotary handle can be displaced with the sliding jaw in a simple manner. An operating device can be realised that, in each position of displacement of the sliding jaw on the guide rail, enables the displacement of the at least one spindle to be controlled.

In particular, an axis of rotation of the rotary handle is at least approximately parallel to a direction of displacement of the displaceability of the at least one spindle on the sliding jaw and/or at least approximately parallel to a direction of displacement of the displaceability of a sliding jaw on the guide rail. This results in a simple compact structure. In particular, a rotatability of the rotary handle relative to the guide rail can thus be realised in a simple manner. This in turn enables a compact structure of the clamp.

It is particularly advantageous if the guide rail is guided through the rotary handle and in particular the rotary handle is displaceable with the sliding jaw. The rotary handle can thus rotate relative to the guide rail in a simple manner.

In one embodiment the rotary handle has a holding element, which in particular is at least approximately cylindrical and which extends in a longitudinal direction and can be grasped by a holding hand of an operator. This holding element can be used to hold the clamp as a whole using one hand. A displacement movement of the at least one spindle can also be brought about by a rotary movement of the holding element as actuation device.

In one embodiment the rotary handle is arranged such that, by means of said handle, a displacement movement of the sliding jaw on the guide rail actuable. For the displacement movement of the sliding jaw on the guide rail, the sliding jaw must be pushed or pulled on the guide rail. The rotary handle can be used as a grip element for a holding hand for a pushing movement or pulling movement. Simple operation and handling are thus provided.

In principle, the actuation device can be a device that only generates signals in order to bring about the displacement movement of the at least one spindle. In an embodiment of simple construction, a torque exerted on the rotary handle (by the operator) can be transmitted to the at least one spindle by means of the transmission device in the form of driving torque in order to rotate and displace the at least one spindle. A displacement movement of the at least one spindle can thus be brought about, activated by means of a rotation of the rotary handle. The driving force necessary for this is introduced by means of the rotary handle and is transmitted in the form of an output force by means of the transmission device to the force application device and the at least one spindle.

In one embodiment the transmission device is a mechanical gearing device, wherein in particular the actuation device is provided as a drive of the gearing device and the force application device for the at least one spindle is provided as an output. The transmission device transmits an appropriate mechanical force, and in particular a torque from the actuation device to the force application device, to the at least one spindle, so as to bring about there a displacement movement.

It is possible here that the force application device is part of the transmission device or is separate therefrom. For example, an appropriate application of force (torque application) to the spindle by means of a gearwheel, which is connected to the corresponding spindle for conjoint rotation, is provided. This gearwheel then forms the force application device for the spindle and can also be part of a gearwheel drive and thus of the transmission device. A separate force application device is for example an electric motor or a sleeve driven in rotation by a gearing, on which sleeve the at least one spindle is mounted by means of a thread.

In one embodiment the gearing device and the force application device convert a rotation of the actuation device into a displacement, and in particular a displacement in rotation, of the at least one spindle. A clamp of simple construction with simple operation and in particular one-handed operation can thus be provided.

One or more axes of rotation of the gearing device is/are advantageously parallel to an axis of rotation of the actuation device and/or an axis of rotation of the at least one spindle. For example, the transmission device comprises a plurality of gearwheels. The corresponding axes of rotation of these gearwheels are then parallel to the aforesaid axes of rotation. This results in a simple compact structure with the possibility of optimised force transmission and in particular torque transmission from the actuation device to the force application device and the at least one spindle.

It is possible here that the gearing device is formed, in respect of the speed of rotation of the actuation device and the speed of rotation of the at least one spindle, as a step-up gearing (with an increase in the speed of rotation), as a step-down gearing (with a reduction in the speed of rotation), or as a gearing that does not change the speed of rotation. The appropriate configuration is dependent for example on the geometric dimensions of the clamp or also on the field of use. For example, it can be advantageous to use a step-down gearing if sensitive materials are to be clamped. If, for example, workpieces that are less sensitive are to be quickly clamped, a step-up gearing may be advantageous.

It is also possible that the gearing device and/or the force application device are configured such that a rotation of the actuation device brings about a rotation of the at least one spindle in the same direction or in the opposite direction.

In one embodiment the transmission device is a gearwheel drive or comprises a gearing of this kind. A torque can be transmitted in a simple manner from a drive side to an output side by means of a gearwheel drive.

In particular, a first gearwheel is then connected to the actuation device for conjoint rotation, and a second gearwheel is connected to the force application device or the at least one spindle for conjoint rotation, wherein in particular the first gearwheel meshes with the second gearwheel, or one or more further gearwheels for transmitting torque from the first gearwheel to the second gearwheel is/are arranged between the first gearwheel and the second gearwheel. The first gearwheel forms a driving gearwheel and the second gearwheel forms an output gearwheel. The transmission path can be formed accordingly by the action of the first gearwheel on the second gearwheel or with gearwheels arranged therebetween.

It is possible alternatively or also additionally that the gearing device is or comprises a chain gearing or a belt gearing, wherein in particular a first pulley element (for a chain or a belt) is connected to the actuation device for conjoint rotation and a second pulley element is connected to the force application device or the at least one spindle for conjoint rotation, and a chain or belt couples the second pulley element to the first pulley element. By means of the chain or the belt, the distance between the actuation device and the force application device or the at least one spindle can be bridged in a manner suitable for the transfer of forces, such that a force (a torque) is introducible simply by a holding hand of the operator for the clamp, which force brings about directly a displacement of the at least one spindle.

It is in principle also possible that mixed forms of gearwheel drive and chain gearing or belt gearing are provided.

It is possible that an element of the transmission device and in particular an element of the gearing device, such as a pulley element or a gearwheel, is directly connected to the at least one spindle for conjoint rotation. This element of the gearing device then also forms the force application device for the at least one spindle.

In one embodiment the force application device has a rotationally fixed element and in particular sleeve, which is coupled to the transmission device and on which the at least one spindle is guided displaceably, wherein the at least one spindle is coupled to the rotatable element for conjoint rotation. The corresponding element, such as a sleeve, can be mounted rotatably on the sliding jaw and at the same time can be mounted in a manner fixed against translation. The at least one spindle is acted on by the appropriate force by means of the element so as to perform a rotation and rotary displacement. It is ensured here that the at least one spindle is coupled to the sliding jaw over a large holding region and in particular a large thread region. This results in a stable construction.

In an alternative embodiment the force application device is an electromotive drive for the at least one spindle, or a hydraulic drive, or a pneumatic drive. The transmission device then provides in particular a signal-operative coupling between the actuation device and the force application device. In particular, control signals are then transmitted by means of the transmission device. An operator then triggers appropriate control signals by means of the actuation device. The necessary driving force for the displacement movement of the at least one spindle is then not provided by the operator, but instead by the corresponding drive.

It is provided here that the actuation device comprises a switch and in particular an electrical switch, or is such a switch, in particular an electrical switch. By actuating this switch, the appropriate drive can then be controlled in order to bring about a displacement movement. It is possible here in principle that the switch is a rotary switch in the form of a rotary handle so as to bring about a displacement movement of the at least one spindle and so as to be able to clamp one or more workpieces between the pressure piece and the fixed jaw.

A contact element is advantageously arranged or formed on the fixed jaw, and the pressure piece of the at least one spindle is arranged such that a projection of the pressure piece with a projection direction parallel to a direction of displacement of the at least one spindle lies on the contact element. A large clamping force can thus be exerted, and one or more workpieces can be clamped between the contact element and the pressure piece.

It is favourable if a blocking device is provided, by means of which the displaceability of the sliding jaw on the guide rail can be blocked at least in one direction. An optimised clamping result with simple operation can thus be obtained. The sliding jaw is prevented from moving back. In principle, a blocking device can be provided which blocks a movability of the sliding jaw in the direction of the fixed jaw or away therefrom. In one embodiment, which is of simple construction, the blocking device ensures that a path of displacement of the sliding jaw away from the fixed jaw is blocked.

The blocking device is then formed in particular such that a path of movement of the sliding jaw away from the fixed jaw can be blocked and a movement of the sliding jaw towards the fixed jaw is allowed. This results in simple operation alongside simple construction.

In an embodiment of simple construction, the blocking device comprises at least one brake element, which has at least two different angular positions relative to the guide rail. In one (first) angular position (or a first position range) the displaceability of the sliding jaw on the guide rail is released, and in a second angular position (or in a second position range) the displaceability is blocked. For example, the angular positions are defined such that, with an appropriate exertion of force, the sliding jaw is always allowed to move towards the fixed jaw, and movement in the opposite direction is blocked.

It is also favourable if a release element for releasing the blocking is provided, which release element can be operated in particular by the operator's holding hand, which hand is holding the clamp. By means of the release element, a brake element for example can be brought into an angular position (for example overcoming the force of a spring device) in which the sliding jaw is displaceable on the guide rail. With appropriate arrangement of said release element, this release can be effected by a finger of the holding hand, which for example is holding the clamp by a handgrip or rotary handle.

In accordance with the invention a method for operating a clamp is provided, wherein the clamp comprises a guide rail, a sliding jaw displaceable on the guide rail, a fixed jaw arranged on the guide rail, and a spindle guided displaceably on the sliding jaw, wherein, in the method, a displacement movement of the spindle on the sliding jaw is controlled by means of an actuation device, wherein the actuation device is spaced from the spindle and the actuation device is coupled to the spindle in signal-transmitting and/or force-transmitting manner, so as to bring about a displacement movement.

The method according to the invention has the advantages already explained in conjunction with the clamp according to the invention.

Further advantageous embodiments have also been explained already in conjunction with the clamp according to the invention.

In particular, the clamp according to the invention can be operated with the method according to the invention, or the method according to the invention can be carried out by the clamp according to the invention.

In particular, it is provided that the actuation device can be operated by a holding hand, which holds the clamp and in particular is formed for the holding of the clamp (as a whole).

In an embodiment of simple construction, a mechanical force which is exerted onto the actuation device is transmitted by means of a transmission device to the spindle and brings about a displacement movement of the spindle. A clamp of compact construction that can be easily operated and in particular operated one-handed thus can be provided.

The following description of preferred embodiments serves in conjunction with the drawings to explain the invention in greater detail.

DETAILED DESCRIPTION OF THE INVENTION

Figure 1:
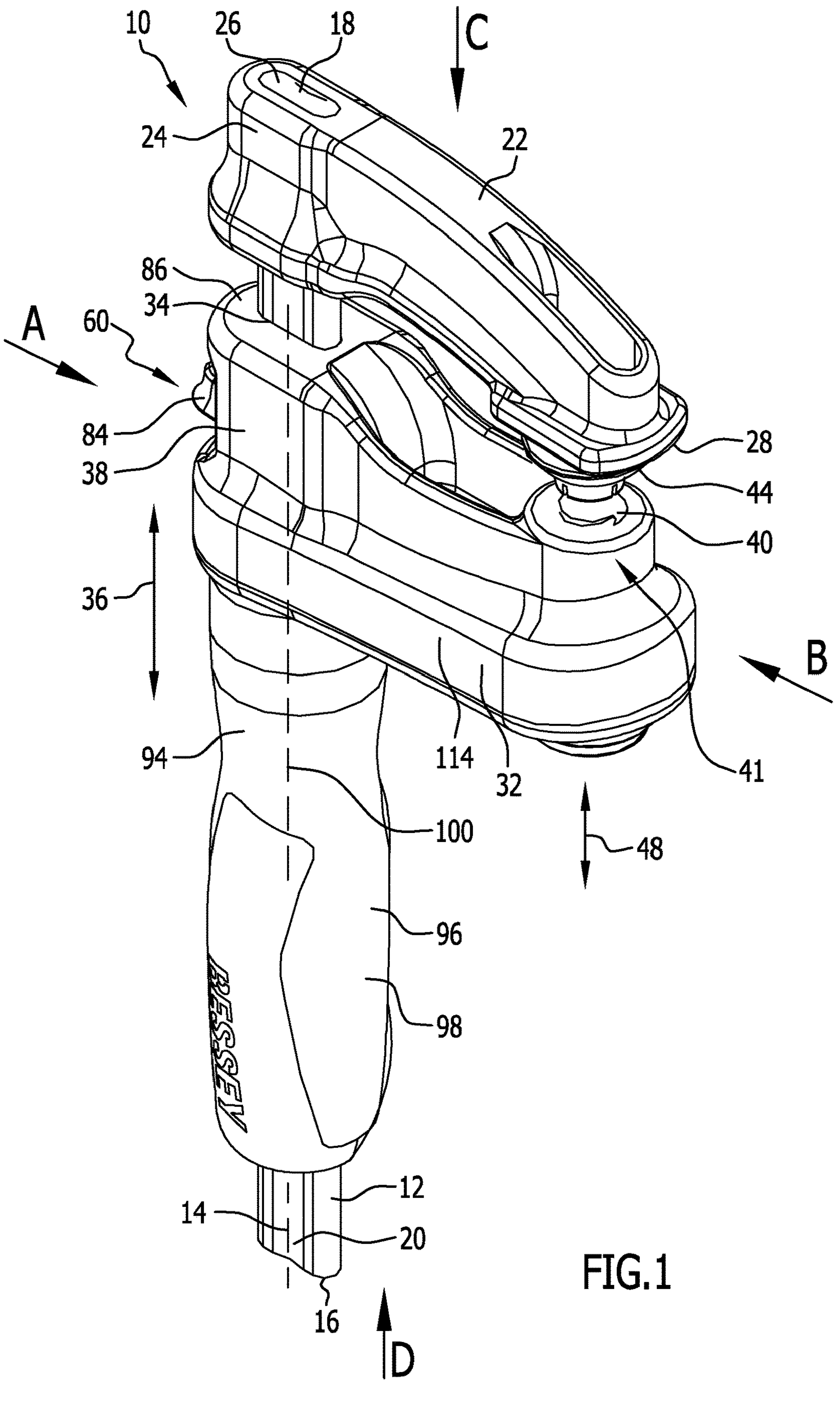
FIG. 1: is an isometric illustration of a first exemplary embodiment of a clamp according to the invention.
Figure 2:
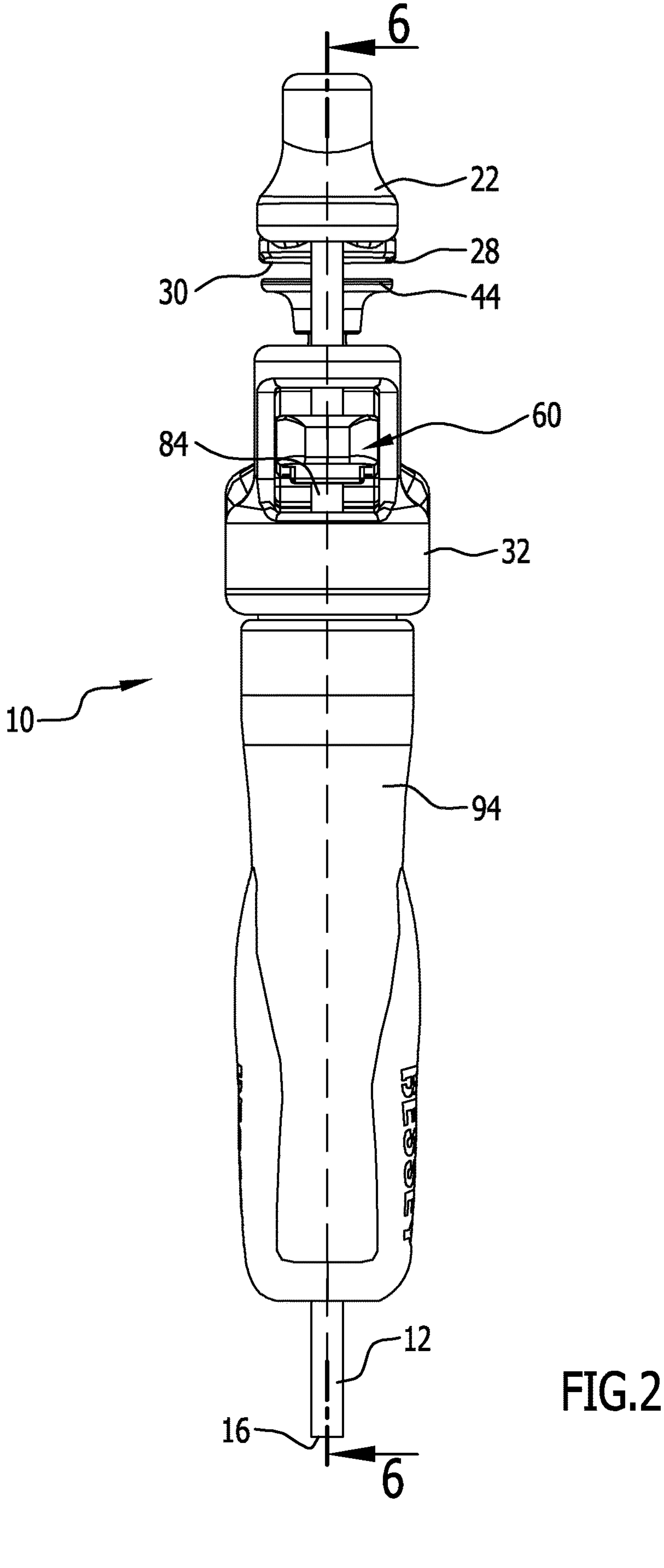
FIG. 2: is a plan view of the clamp according to FIG. 1 in the direction A.
Figure 3:
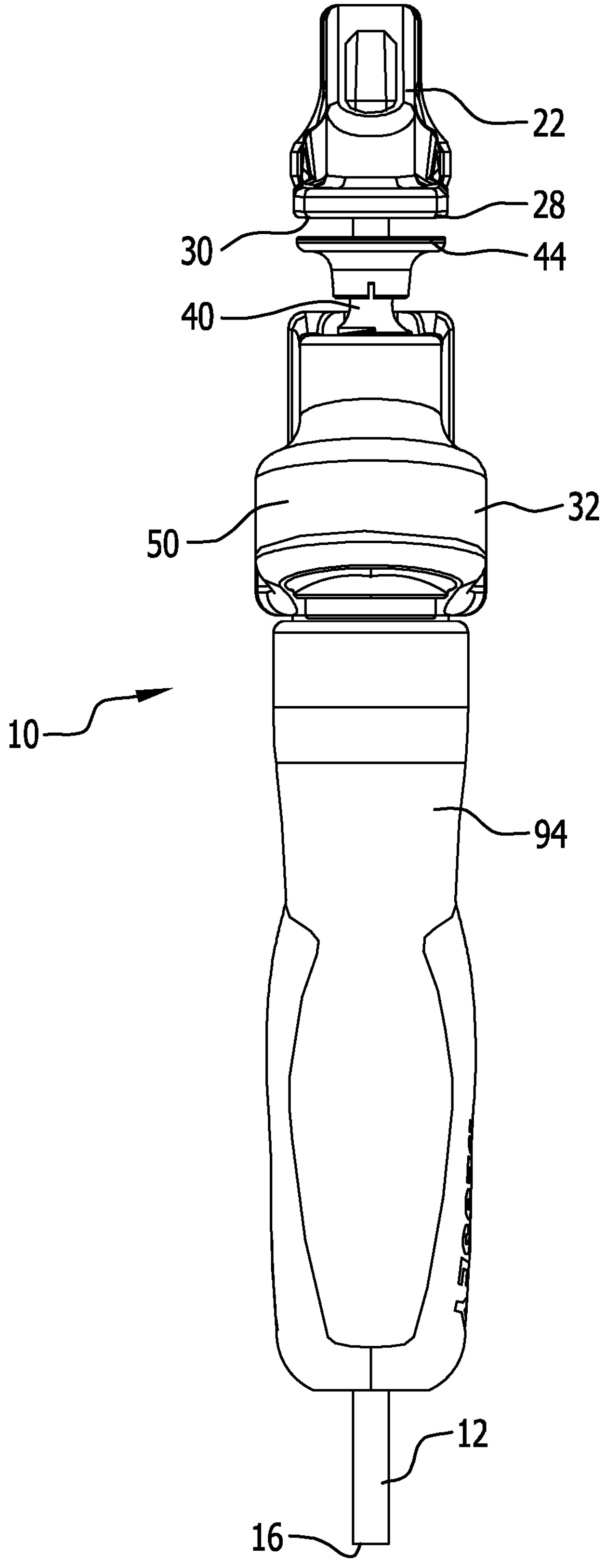
FIG. 3: is a further plan view of the clamp according to FIG. in the direction B.
Figure 4:
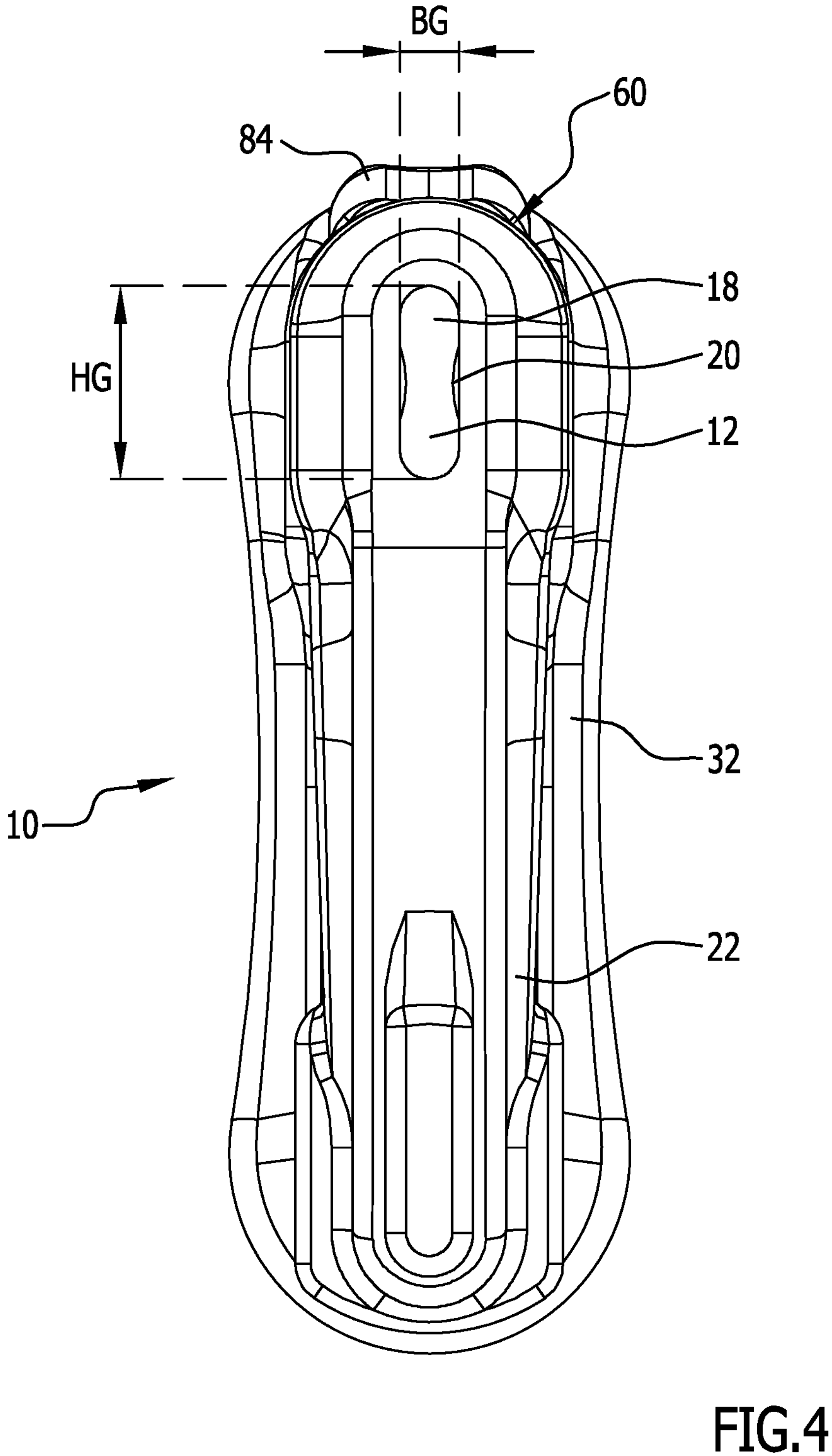
FIG. 4: is a front view of the clamp according to FIG. 1 in the direction C.
Figure 5:
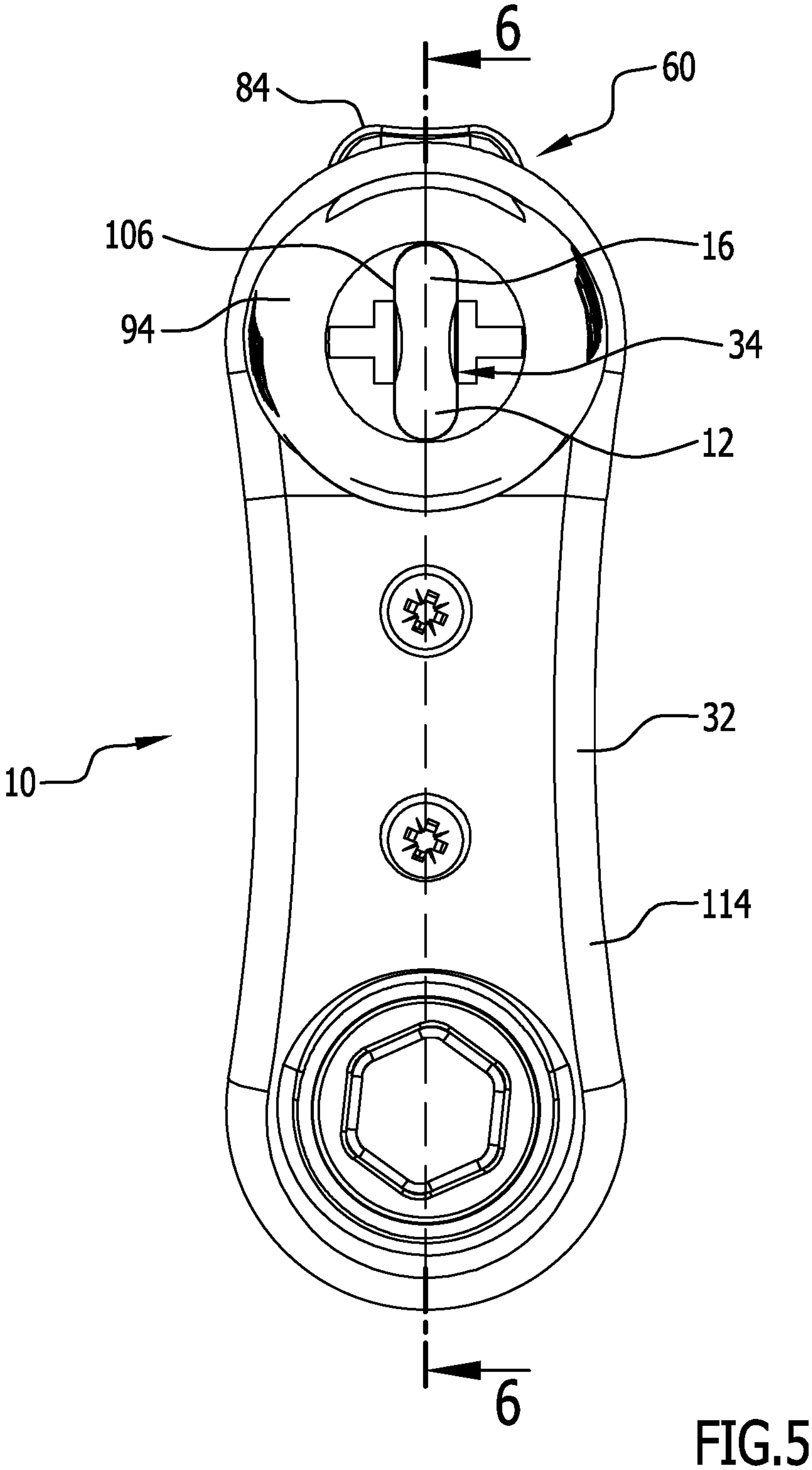
FIG. 5: is a rear view of the clamp according to FIG. 1 in the direction D.

A first exemplary embodiment of a clamp according to the invention, which is shown in FIGS. 1 to 9 and is denoted by 10, comprises a guide rail 12. The guide rail 12 extends in a longitudinal direction 14 between a first end 16 and a second end 18.

The guide rail 12 is profiled. It has, in cross-section (for example see FIG. 4), a height HG, which is greater than a width BG transverse to this height. For example, the height HG is at least 3 times greater than the width BG.

The guide rail 12, in cross-section, has a rectangle as envelope, wherein the edges are rounded. It also has mutually opposed trough-like recesses 20 in a middle region, based on a height direction.

The guide rail 12 is produced in particular from a metallic material.

In the region of the second end 18, a fixed jaw 22 is arranged on the guide rail 12. This fixed jaw 22 is permanently fixed to the guide rail 12.

In one embodiment the fixed jaw 22 is an element which is produced separately from the guide rail 12 and is permanently fixed thereto subsequently.

It is also possible in principle that the fixed jaw 22 is connected releasably to the guide rail 12.

It is also possible in principle that the fixed jaw 22 is formed integrally on the guide rail 12.

In one embodiment the fixed jaw 22 is a part separate from the guide rail 12 and for example is a plastics part.

The fixed jaw extends away from the guide rail 12 in a direction perpendicular to the longitudinal direction 14.

The fixed jaw 22 has a fixing region 24, by means of which it is held on the guide rail 12. The fixing region has a receptacle 26, into which the guide rail 12 is inserted. For example, a further fixing of the fixed jaw 22 by way of the fixing region 24 of the guide rail 12 is provided by means of one or more screws, pins, bolts, etc.

A contact element 28 is arranged or formed on the fixed jaw 22. This contact element 28 provides a contact face 30 for a workpiece. The contact face 30 is in particular a flat face.

The contact element 28 with the contact face 30 is spaced from the guide rail 12 in a transverse direction relative to the longitudinal direction 14.

The clamp 10 comprises a sliding jaw 32. This is mounted on the guide rail 12 (slidingly) displaceably.

The sliding jaw 32 has a first guide device 34. By means of this first guide device 34, the sliding jaw 32 is arranged on the guide rail 12 guidably, with a direction of displacement 36 (direction and opposite direction). This direction of displacement 36 is in particular parallel to the longitudinal direction 14 of the guide rail 12. It can also be arranged at an acute angle.

The first guide device 34 is formed in a guide region 38 of the sliding jaw 32. It is formed in particular as a cut-out, through which the guide rail 12 passes.

This cut-out is adapted in terms of its form to the corresponding profiling of the guide rail 12, such that, where possible, play-free sliding is made possible.

On the sliding jaw 12, spaced from the guide region 38 and thus also spaced from the guide rail 12, there is arranged (at least) one spindle 40 on a second guide device 41 of the sliding jaw 32. This spindle 40 has an extent in a longitudinal direction 42, which is parallel to the longitudinal direction 14 of the guide rail 12 or parallel to the direction of displacement 36 of the sliding jaw 32 on the guide rail 12.

A pressure piece 44 is seated on the spindle 40 or is formed thereon.

In one embodiment the pressure piece 44 is an element which is separate from the spindle 40 and which is fixed in the region of a first end 46 of the spindle.

It can be provided here that the pressure piece 44 is mounted pivotably on the spindle 40, for example by means of a type of ball bearing, so as to enable an appropriate movability of the pressure piece 44 on the spindle 40.

The spindle 40 is mounted on an appropriate bearing region 50 of the sliding jaw 32 so as to be displaceable in a direction of displacement 48 (direction and opposite direction), wherein the second guide device 41 is seated on this bearing region 50.

The direction of displacement 48 of the spindle 40 on the sliding jaw 32 is parallel to the longitudinal direction 42 of the spindle 40.

The direction of displacement 48 is parallel to the direction of displacement 36 of the sliding jaw 32 on the guide rail 12.

The spindle 40 is positioned on the sliding jaw 32 in a manner directed towards the contact element 28 with its contact face 30. A projection of the spindle 40 or of the pressure piece 44 in the longitudinal direction 42 onto the fixed jaw 22 lies on the contact element 28.

The pressure piece 44 has a contact face 52, which in particular is flat. This contact face 52 faces towards the contact face 30 of the fixed jaw 22. Accordingly, the contact face 30 of the fixed jaw 22 faces towards the contact face 52 on the pressure piece 44 of the spindle 40.

One or more workpieces can be clamped between the sliding jaw 32 and the fixed jaw 22. Here, contact at the contact faces 30 and 52 is provided.

In one embodiment the spindle 40 is mounted rotatably on the bearing region 50 of the sliding jaw 32. An axis of rotation 54 of the spindle 40 on the sliding jaw 32 is parallel to or coaxial with the longitudinal direction 42 and parallel to or coaxial with the direction of displacement 48.

The spindle 40 is formed in particular as a screw spindle with a thread 56, which engages in a counter thread 58 on the bearing region 50 of the sliding jaw 32.

The thread 56 is in particular an external thread, and the counter thread 58 is an internal thread.

By means of a rotation of the spindle 40 about the axis of rotation 54, a displacement in the direction of displacement 48 can then be achieved.

Depending on the direction of rotation, the pressure piece 44 can be displaced towards the contact element 28 or away therefrom.

As mentioned, the sliding jaw 32 is displaceable on the guide rail 12 in the direction of displacement 36. The clamp 10 comprises a blocking device 60, so as to block the displaceability of the sliding jaw 32 on the guide rail 12, at least in one direction.

It is possible here in principle that the blocking device 60 is formed such that the displaceability of the sliding jaw 32 on the guide rail 12 can be blocked both in the direction of the fixed jaw 22 and also away from the fixed jaw 22.

In a shown embodiment the blocking device 60 is configured such that only the displaceability of the sliding jaw 32 on the guide rail 12 away from the fixed jaw 22 is blocked.

Figure 6:
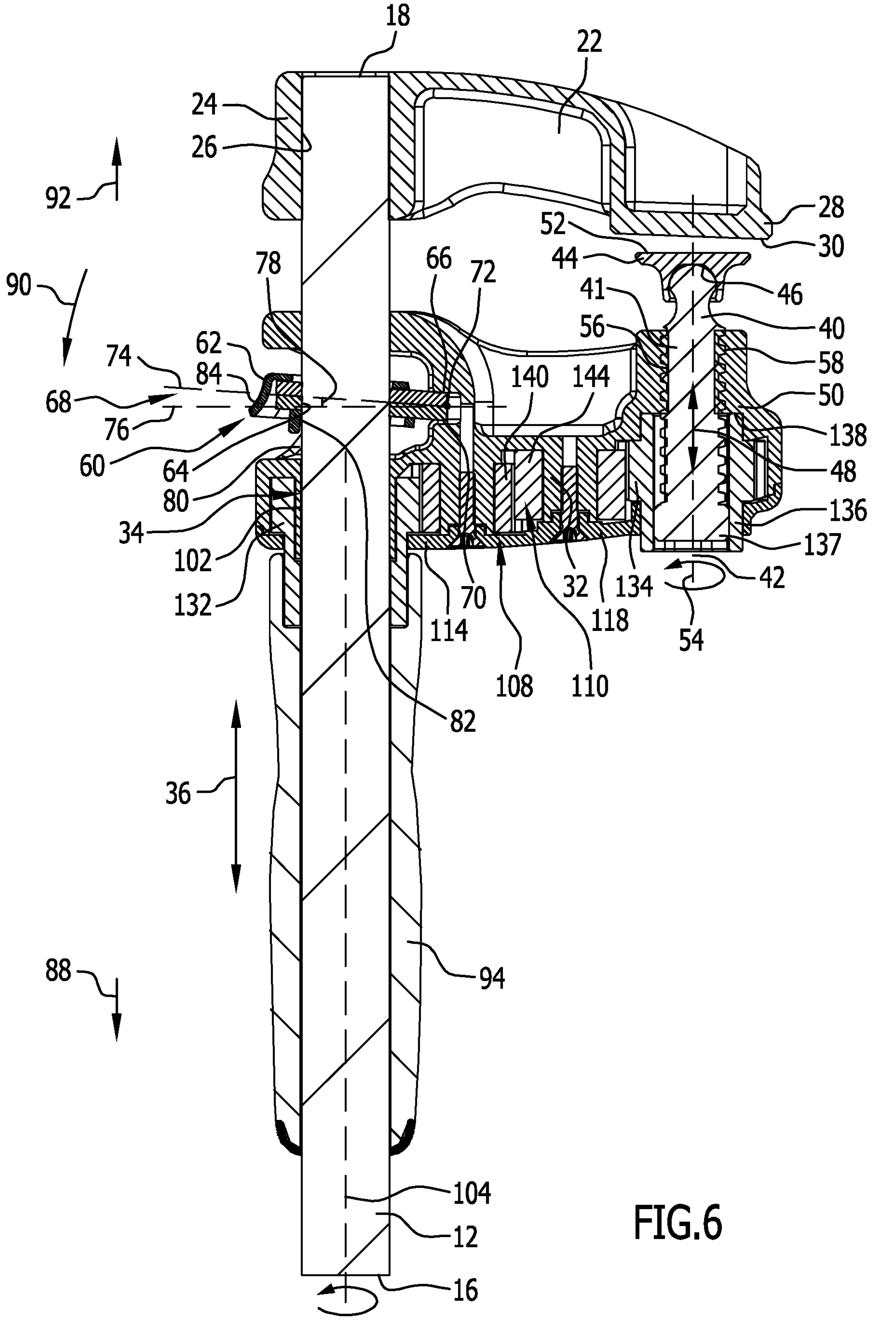
FIG. 6: is a sectional view along the line 6-6 according to FIGS. 2 and 5.
Figure 7:
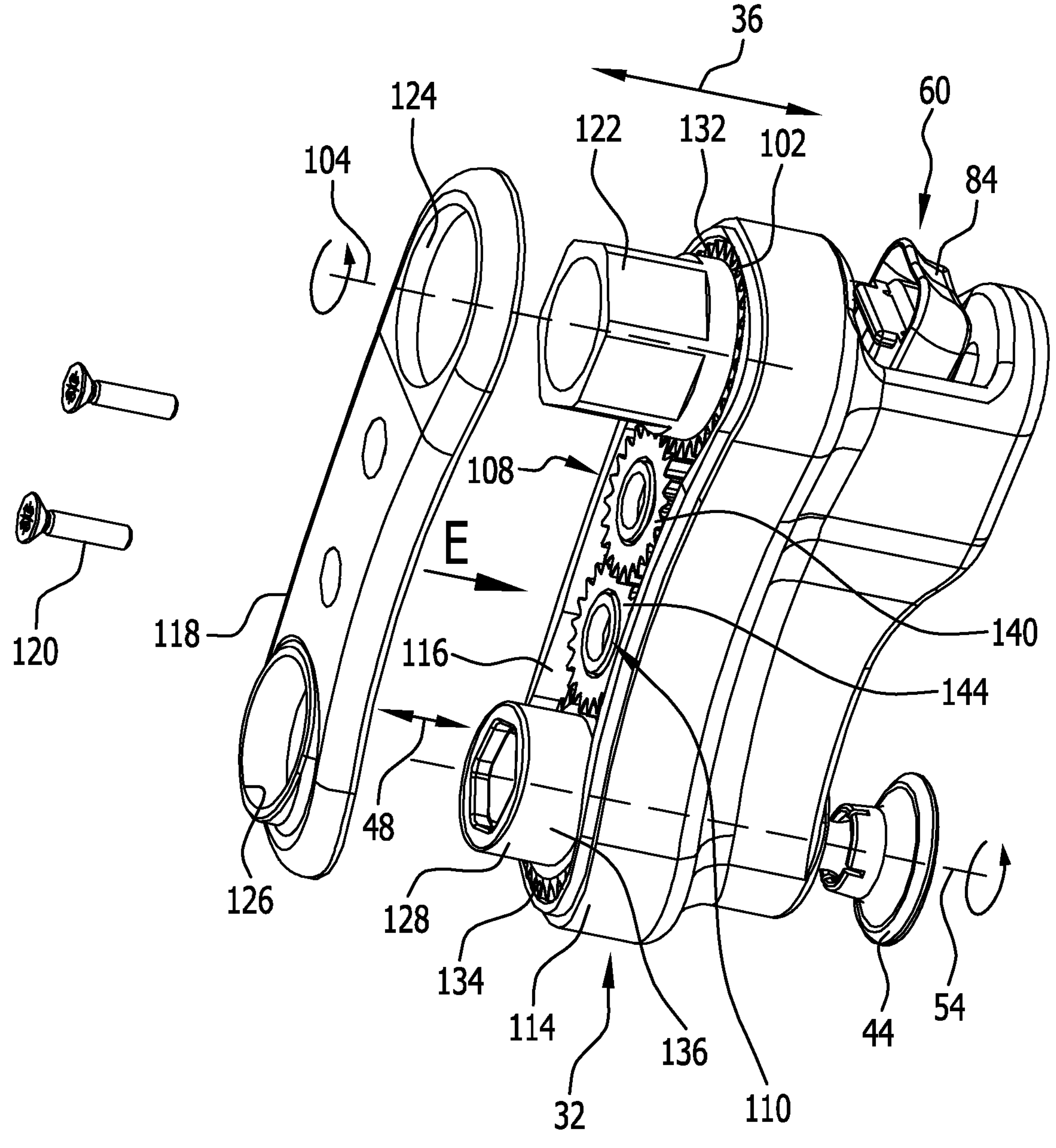
FIG. 7: is an exploded view of an exemplary embodiment of a sliding jaw of the clamp according to FIG. 1.
Figure 8:
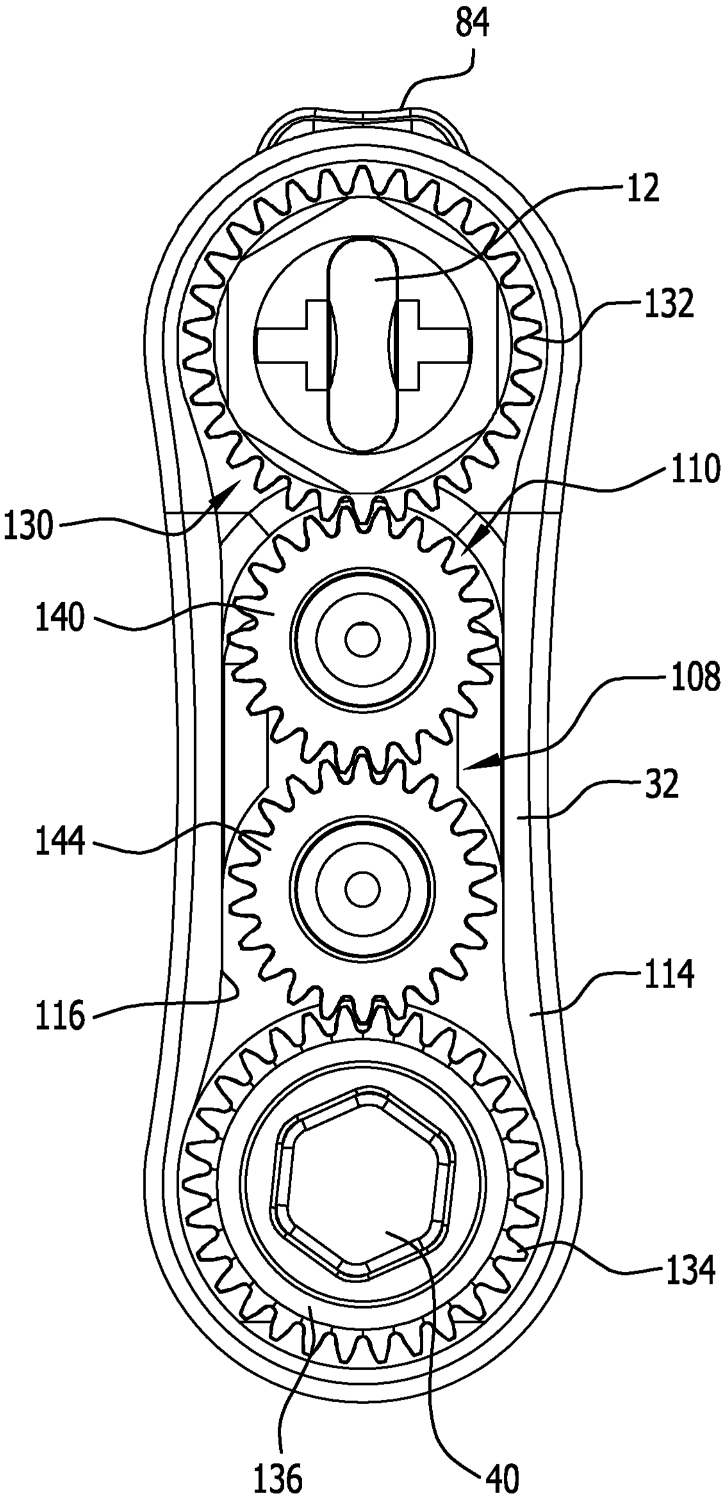
FIG. 8: is a plan view of the sliding jaw according to FIG. 7 in the direction E.
Figure 9:
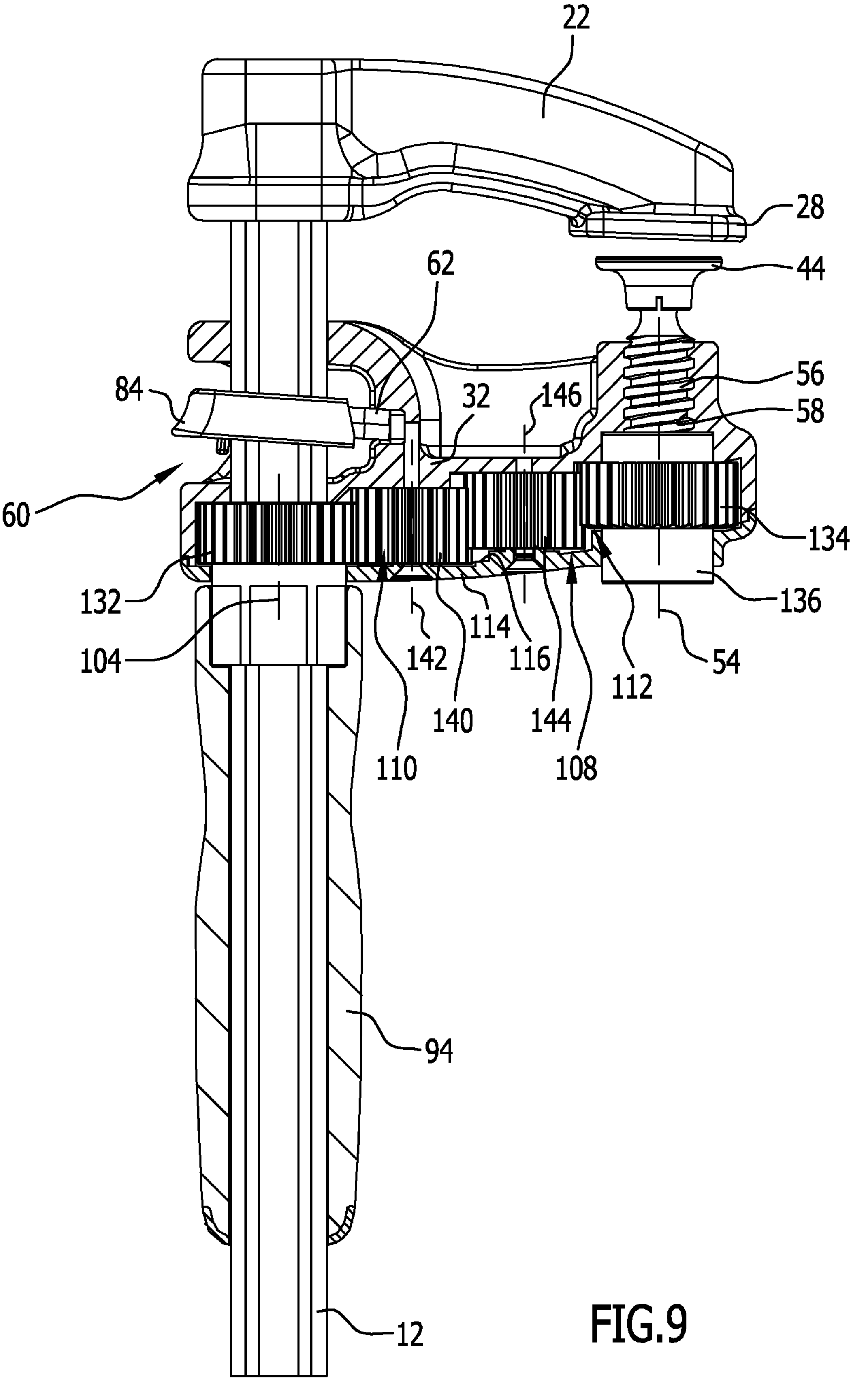
FIG. 9: is a further partial sectional view of the clamp according to FIG. 1.

In one embodiment the blocking device 60 comprises a brake element 62 (FIG. 6). The brake element 62 is formed by one or more sheet metal plates, and in particular by a sheet metal plate stack.

The brake element 62 has a cut-out 64, through which the guide rail 12 passes.

The brake element 62, in the region of one end 66, is mounted on the sliding jaw 32 in the guide region 38, and moreover is mounted in such a way that an angular position of the brake element 62 relative to the guide rail 12 is changeable.

A recess 70 is formed accordingly on the guide region 38 of the sliding jaw 32, in which recess the brake element 62 sits pivotably. A corresponding pivot axis 72 lies perpendicularly to the longitudinal direction 14 of the guide rail 12. In FIG. 6 this pivot axis 72 lies perpendicularly to the drawing plane.

The pivot axis 72 does not necessarily have to be a spatially fixed axis, but instead can change its position in principle.

The brake element 62 has a basic position 74, in which the brake element 62 is inclined at a (small) acute angle 78 based on a plane 76 perpendicular to the longitudinal direction 14 of the guide rail 12.

This acute angle 78 lies here in the order of 5° in one embodiment.

The acute angle 78 lies here in the direction of the fixed jaw 22.

The basic position 74 is achieved for example by a spring device 80, which is supported on the brake element 62 and a corresponding support region 82 in the guide region 38 of the sliding jaw 32. The spring device 80 presses the brake element 62 out of the plane 76 into its basic position 74 with the acute angle 78.

As a result of the action of a force against the spring force of the spring device 80, the brake element 62 can be brought into a position at least approximately parallel to the plane 76.

The blocking device 60 comprises a release element 84. This release element 84 is arranged on the sliding jaw 32 (and in particular on the brake element 62) such that an operator can access it in the manner of a switch, and in so doing in particular can position the brake element 62, overcoming the force of the spring device 80, at least approximately parallel to the plane 76, in order to cancel the blocking effect.

The release element 84 is accessible in particular from an upper side 86 of the sliding jaw 32. This upper side 86 faces away from that side of the sliding jaw 32 in the vicinity of which the spindle 40 is seated. This upper side 86 lies above the guide rail 12, whereby the spindle 40 is then positioned beneath the guide rail 12.

In the shown exemplary embodiment the shown blocking device 60 is configured such that the spring device 80 produces the basic position 74 (FIG. 6).

If it is attempted to displace the sliding jaw 32 away from the fixed jaw 22 (indicated in FIG. 6 by the arrow with the reference sign 88), the brake element 62 then tilts relative to the guide rail. In particular, it can dig into the guide rail 12. The displaceability of the sliding jaw 32 in the direction 88 is thus blocked.

By changing the angular position of the brake element 62, this blocking can be cancelled. If an operator accesses the release element 84 and pivots it in a direction 90, the tilting of the brake element 62 relative to the guide rail 12 is then cancelled accordingly, and the sliding jaw 32 is freely displaceable on the guide rail 12 and is also displaceable in the direction 88.

In order to pivot the brake element 62 in the direction 90, the force of the spring device 80 must be overcome.

If the brake element 62 is in its basic position 74, the sliding jaw 32 can still be displaced in a direction 92 (opposite direction to the direction 88) towards the fixed jaw 22 (provided the pressure piece 44 is not in contact against the contact element 28 or one or more workpieces lies/lie between the fixed jaw 22 and the sliding jaw 32).

By means of a displacement of the sliding jaw 32 in the direction 92, the tilting of the brake element 62 is cancelled if a force sufficiently great for the displacement is exerted.

By means of the described construction of the blocking device 60 with the brake element 62, blocking in one direction is achieved.

The clamp 10 comprises an actuation device 94 for an operator, by means of which the operator can activate a displacement movement of the spindle 40 on the sliding jaw.

In one exemplary embodiment the actuation device 94 is formed as a handgrip 96. This handgrip 96 has in particular an at least approximately cylindrical holding element 98, which can be grasped by a holding hand of the operator.

This holding element 98 extends in a longitudinal direction 100 (FIG. 1), which is oriented parallel to the longitudinal direction 14 of the guide rail 12.

The actuation device 94 with the handgrip 96 or the holding element 98 is oriented along the guide rail 12 and is directed away from the sliding jaw 32 in a direction from the second end 18 of the guide rail 12 to the first end 16.

The handgrip 96 is formed as a rotary handle. It is mounted rotatably on the sliding jaw 32 by means of a rotary bearing 102. It is seated here on a side of the sliding jaw 32 that is remote from the fixed jaw 22.

An axis of rotation 104 about which the handgrip 96 (rotary handle 96) is rotatably mounted on the sliding jaw 32 is parallel to or coaxial with the longitudinal direction 14 of the guide rail 12 and parallel to or coaxial with the direction of displacement 36 of the sliding jaw 32 on the guide rail 12.

The axis of rotation 104 in one embodiment is parallel to the axis of rotation 54 for a rotatability of the spindle 40 on the sliding jaw 32. The axes of rotation 54 and 104 are spaced from one another in parallel.

The axes of rotation 54 and 104, however, can also be arranged at an acute angle to one another.

The actuation device 94 (the handgrip or rotary handle 96) has a cut-out 106, through which the guide rail 12 is guided. This guidance of the guide rail through the cut-out is such that the actuation device 94 is rotatable on the guide rail 12, i.e. the handgrip or rotary handle 96 is rotatable relative to the guide rail 12; the guide rail 12 does not hinder the rotatability of the handgrip or rotary handle 96.

A transmission device 108 for transmitting a torque, which is introduced by an operator at the actuation device 94 (the handgrip or rotary handle 96), to the spindle 40 in order to bring about a corresponding displacement of the spindle 40 in the direction of displacement 48 is provided. The actuation device 94 and the spindle 40 are spaced from one another. The transmission device 108 ensures that this space is "bridged" in a force-transmitting or torque-transmitting way, so as to be able to perform a displacement of the spindle 40 by means of the actuation device 94.

In one exemplary embodiment the transmission device 108 is formed as a mechanical gearing device 110.

A force application device 112 is provided, by means of which the spindle 40 can be acted on with a corresponding force (a corresponding torque), so as to be able to perform a spindle displacement triggered and in particular activated by the actuation device 94. This force is fed to the force application device 112 by the transmission device 108.

The sliding jaw 32 comprises a housing 114 with a housing interior 116. The transmission device 108 and in particular the mechanical gearing device 110 and (at least in part) the force application device 112 are arranged in the housing interior 116.

The spindle 40 is also positioned at least in part in the housing interior 116.

The housing 114 is closed. In particular, a housing cover 118 (FIG. 7) is provided. This housing cover 118 is arranged on the sliding jaw 32 in particular remotely from the fixed jaw 42 and for example is connected releasably to the rest of the housing 114 by means of screws 120.

In one exemplary embodiment a shaft element 122 of the rotary bearing 102 is passed through a corresponding cut-out 124 in the housing cover 118. The handgrip or rotary handle 96 is connected to said shaft element 122 for conjoint rotation.

It can also be provided that a region 128 of the force application device 112 is passed through a corresponding cut-out 126. Here, it is provided in particular that this region 128 is rotatable in the cut-out 124.

In an alternative embodiment the region 128 is arranged completely in the housing 114 and is covered by the housing cover 118.

In principle, the cut-out 124 can be provided as a plain bearing region for the region 128 of the spindle 40.

It is accordingly possible that the cut-out 124 is formed as a plain bearing region for the shaft element 122 or the handgrip 96.

In one exemplary embodiment the mechanical gearing device 110 is a gearwheel drive 130. This gearwheel drive 130 comprises a first gearwheel 132, which is connected to the actuation device 94 (the handgrip or rotary handle 96) for conjoint rotation. This first gearwheel 132 has, accordingly, an axis of rotation coaxial with the axis of rotation 104.

A rotation of the handgrip or rotary handle 96 brings about a synchronous rotation of the first gearwheel 132. The primary rotation is implemented here at the handgrip 96, whereby a rotation of the first gearwheel 132 in the housing interior 116 is brought about.

The second gearwheel 134 is connected to a sleeve 136 for conjoint rotation. The sleeve 136 is mounted so as to be able to rotate about the axis of rotation 54 and at the same time is arranged on the sliding jaw 32 in a manner fixed against movement in translation. The region 128 is formed on the sleeve.

The spindle 40 is fixed to the sleeve 136 for conjoint rotation. To this end, the spindle 40 is provided for example with a hexagonal contour, which lies in a hexagonal cavity in the sleeve 136. The spindle 40 is mounted displaceably on the sleeve 136.

A rotation of the sleeve 136 with the spindle 40 can be brought about by the second gearwheel 134, which rotation, depending on its direction, results in a displacement movement of the spindle 40 towards the fixed jaw 22 or away therefrom on account of the engagement of the thread 56 with the counter thread 58.

An engagement region of the thread 56 of the spindle 40 on the counter thread 58 of the sliding jaw 32 is spaced from the sleeve 136 and thus also a region in which the spindle 40 is inserted within the sleeve 136.

The sleeve 136 forms the force application device 112 for the spindle 40, by means of which the torque originating from the actuation device 94 is coupled into the spindle 40 for the movement in rotation thereof.

A stop element 137 (FIG. 6) sits on the spindle 40 at an end region. This stop element 137 is displaceable merely within the sleeve 136. A shoulder 138 is formed on the sliding jaw 32 in the region of an end of the counter thread 58. When the stop element 137 contacts the shoulder 138, this defines a position of maximum displacement of the spindle 40, in which said spindle protrudes maximally to the front on the sliding jaw 32 towards the fixed jaw 22.

It is possible in principle that the first gearwheel 132 engages directly with the second gearwheel 134 so as to enable the corresponding transmission of torque from the actuation device 94 to the spindle 40.

In the shown exemplary embodiment further gearwheels are provided between the first gearwheel 132 and the second gearwheel 134.

The first gearwheel 132 engages with a third gearwheel 140. This third gearwheel 140 is mounted so as to be able to rotate about an axis of rotation 142, which is parallel to the axes of rotation 104 and 54. The third gearwheel 140 is arranged in the housing interior 116.

The third gearwheel 140 meshes with a fourth gearwheel 144, which is mounted so as to be rotatable about an axis of rotation 146 parallel to the axes of rotation 54, 104, 142. The fourth gearwheel 144 is positioned in the housing interior 116.

The fourth gearwheel 144 then meshes with the second gearwheel 134.

As a result of this chain of action of gearwheels 132, 140, 144, 134, the torque that is introduced by means of the actuation device 94 is transmitted to the spaced spindle 40 for the displacement thereof in the direction of displacement 48.

It is possible in principle that the transmission device 108 and in particular mechanical gearing device 110, based on a speed of rotation (number of revolutions) of the actuation device 94 about the axis of rotation 104, is formed as a step-down gearing, step-up gearing, or gearing in which the speed of rotation remains the same. In the case of a step-down gearing the speed of rotation of the spindle 40 about the axis of rotation 54 is reduced compared to the original speed of rotation of an actuation device 94, and in the case of a step-up gearing it is increased.

In the shown exemplary embodiment, the speed of rotation is maintained at the same level.

It is also possible that a rotation at the handgrip or rotary handle 96 is converted into a rotation in the same direction of the spindle 40 or into a rotation in the opposite direction. In the shown exemplary embodiment the rotation is converted in the opposite direction, that is to say, when the handgrip 96 is rotated in a clockwise direction, the spindle 40 is rotated in an anticlockwise direction.

The number of gearwheels of the gearwheel drive 130 determines whether the rotation is performed in the opposite direction or in the same direction, and in the shown exemplary embodiment the rotation is in the opposite direction on account of an even number of gearwheels, specifically the four gearwheels 132, 134, 140, 144. With an odd number of gearwheels, rotation in the same direction can be achieved.

The number of gearwheels of the gearwheel drive 130 is determined by the geometric dimensions of the clamp 10 and also by the field of use.

The gearwheels of the gearwheel drive 130 are produced for example from a plastics material.

For example, if workpieces that can be easily destroyed are to be clamped, it can be expedient to provide a step-down gearing, or, in the case of "rough" workpieces, if rapid clamping is desired, it can be expedient to provide a step-up gearing.

The clamp 10 can be operated one-handed. An operator can hold the clamp 10 as a whole at the handgrip 96. The operator can bring about a displacement of the sliding jaw 32 on the guide rail 12 by means of the handgrip 96. The operator can also access the release element 94 using a finger of the holding hand, which grasps the handgrip 96, and can bring said release element into a release position.

The operator can also introduce a torque at the clamp 10 by means of his holding hand, which torque is then transmitted by means of the transmission device 108 and the force application device 112 to the spindle 40, and a displacement of the spindle 40 is made possible. The direction of rotation of the rotation at the handgrip 96 determines whether the spindle 40 is displaced towards the fixed jaw 22 or away therefrom.

It is also possible in principle that a gearwheel of the gearing device is directly connected to the spindle 40 for conjoint rotation. This gearwheel then forms the force application device. In the case of a gearwheel of this kind, engagement by the transmission device must then be ensured on account of the displacement of the spindle 40, in each position of the spindle 40.

The clamp 10 functions as follows:

One or more workpieces is/are to be clamped between the fixed jaw 22 (the contact element 28) and the sliding jaw 32 (the pressure piece 44).

An operator holds the clamp 10 by the operating device 94, that is to say the handgrip 96. He will have positioned the spindle 40 beforehand such that said spindle is not at an end point of its range of displacement, but still can be displaced in the direction of the fixed jaw 22. The operator then slides the sliding jaw 32 in the direction of the fixed jaw 22 by means of the handgrip 96, until the pressure piece 44 bears against a corresponding workpiece between the fixed jaw 22 and the sliding jaw 32.

The blocking device 60 is configured such that this movement towards the fixed jaw is permitted. A displacement of the sliding jaw 32 on the guide rail 12 in the direction 92 (opposite direction) is blocked by the blocking device 60.

The operator can then use his holding hand, which is holding the handgrip 96, to introduce a torque by means of the actuation device 94 by appropriate rotation about the axis of rotation 104.

This torque is transmitted to the spindle 40 by the transmission device 108, and at the clamp 10 by means of the gearwheels of the gearwheel drive 130. With an appropriate direction of the rotation, the spindle 40 can thus be displaced in the direction of the fixed jaw 22, and the one or more workpieces can be clamped in position.

The clamp allows complete one-handed operation. An operator for example has his non-holding hand free for positioning or holding of one or more workpieces, which is/are to be clamped between the fixed jaw 22 and the sliding jaw 32.

Simple operation thus results.

The sleeve 136 forms the force application device 112, wherein the position in translation of the sleeve 136 on the sliding jaw 32 is fixed. The sleeve 136 is rotatable about the axis of rotation 104 on the sliding jaw 132. The spindle 104 is inserted to a varying extent into the sleeve 136 depending on the position of displacement relative to the sliding jaw 32. The spindle is mounted on the sleeve 136 non-rotatably and displaceably in translation (in particular by means of a slide bearing).

A rotation of the sleeve 136 brings about a rotation of the spindle 40 in the counter thread 58 and thus a displacement in translation of the spindle 40 on the sliding jaw 32. Specifically, this displaceability is enabled by the mounting of the spindle 40 in the sleeve 136 in a manner displaceable in translation until the stop element 137 contacts the shoulder 138.

In the case of the gearwheel drive 130, the actuation device 94 of the drive is provided by the connection of the first gearwheel 132 to the actuation device 94 (the handgrip or the rotary handle 96) for conjoint rotation.

The output at the force application device 112 and thus at the spindle 40 is provided by means of the coupling of the second gearwheel 134 to the force application device 112 for conjoint rotation, that is to say by means of the connection of the second gearwheel 134 to the sleeve 136 for conjoint rotation.

Figure 10:
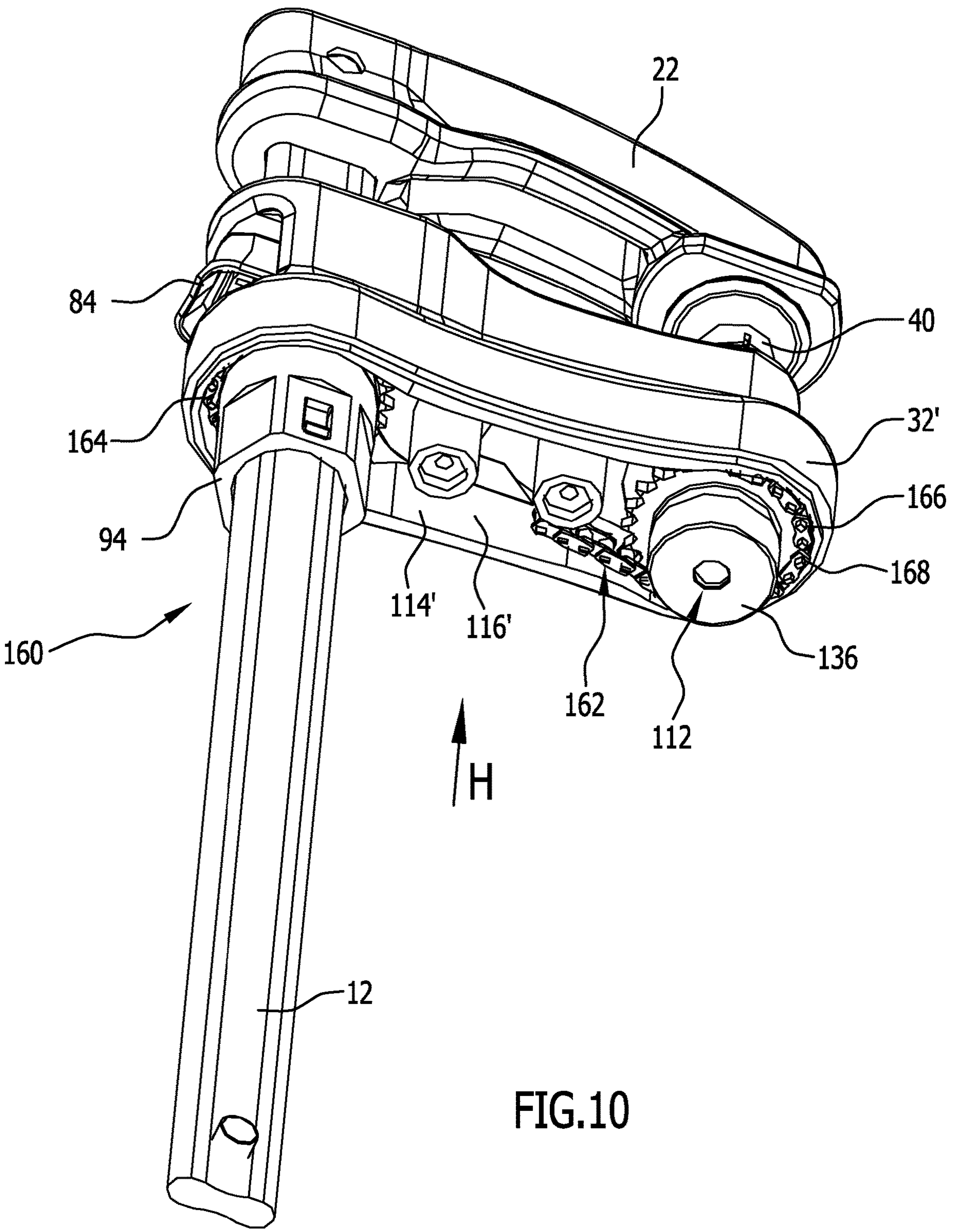
FIG. 10 is an isometric partial illustration (without handgrip and with open sliding jaw housing) of a second exemplary embodiment of a clamp according to the invention.
Figure 11:
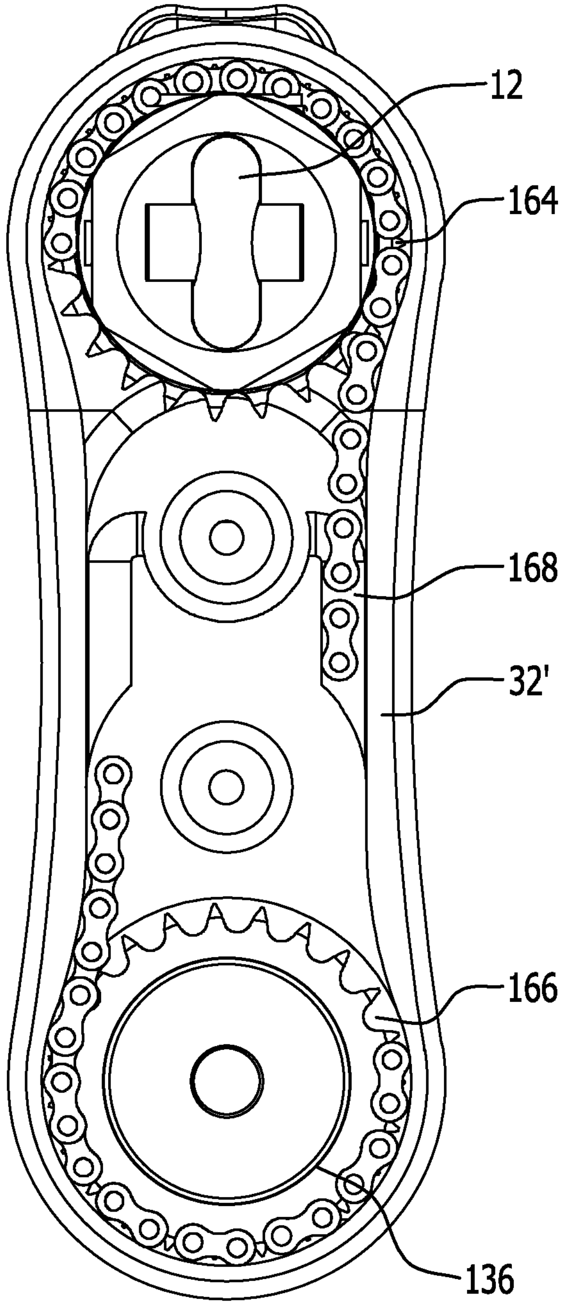
FIG. 11: is a view of the clamp according to FIG. 10 in the direction F.

A second exemplary embodiment of a clamp according to the invention, which is shown in a partial illustration in FIGS. 10 and 11 and is denoted by 160, is in principle of identical construction to the clamp 10 and differs only in the construction of the transmission device. Like reference signs have been used for elements similar to those in the clamp 10.

The clamp 160 comprises a sliding jaw 32', which has a housing 114' with a housing interior 116'.

A transmission device 162 is arranged in the housing interior 116' and is constructed as a mechanical gearing device. The transmission device 162 is constructed as a belt drive or chain drive.

A first pulley element 164 is connected to the corresponding actuation device 94 for conjoint rotation, wherein the handgrip 96 is not shown in FIG. 10. A second pulley element 166 is connected to the sleeve 136 for conjoint rotation.

The first pulley element 164 and the second pulley element 166 are coupled to one another for the transfer of torque by means of a belt or a chain 168.

A torque introduced by means of the actuation device 94 is transmitted by means of the belt or the chain 168 to the second pulley element 166 and is transmitted from there to the force application device 112 in order to provide a rotary movement of the spindle 40.

The transmission device 162, in its configuration as a belt drive or chain drive, ensures a physical "bridging" at the sliding jaw 32' for the transmission of torque to the spindle 40.

Otherwise, the clamp 160 acts similarly to the clamp 10.

Due to the connection of the first pulley element 164 to the actuation device 94 for conjoint rotation, the drive in the clamp 160 for the corresponding mechanical gearing device is the actuation device 94. The output is formed by the force application device 112.

Figure 12:
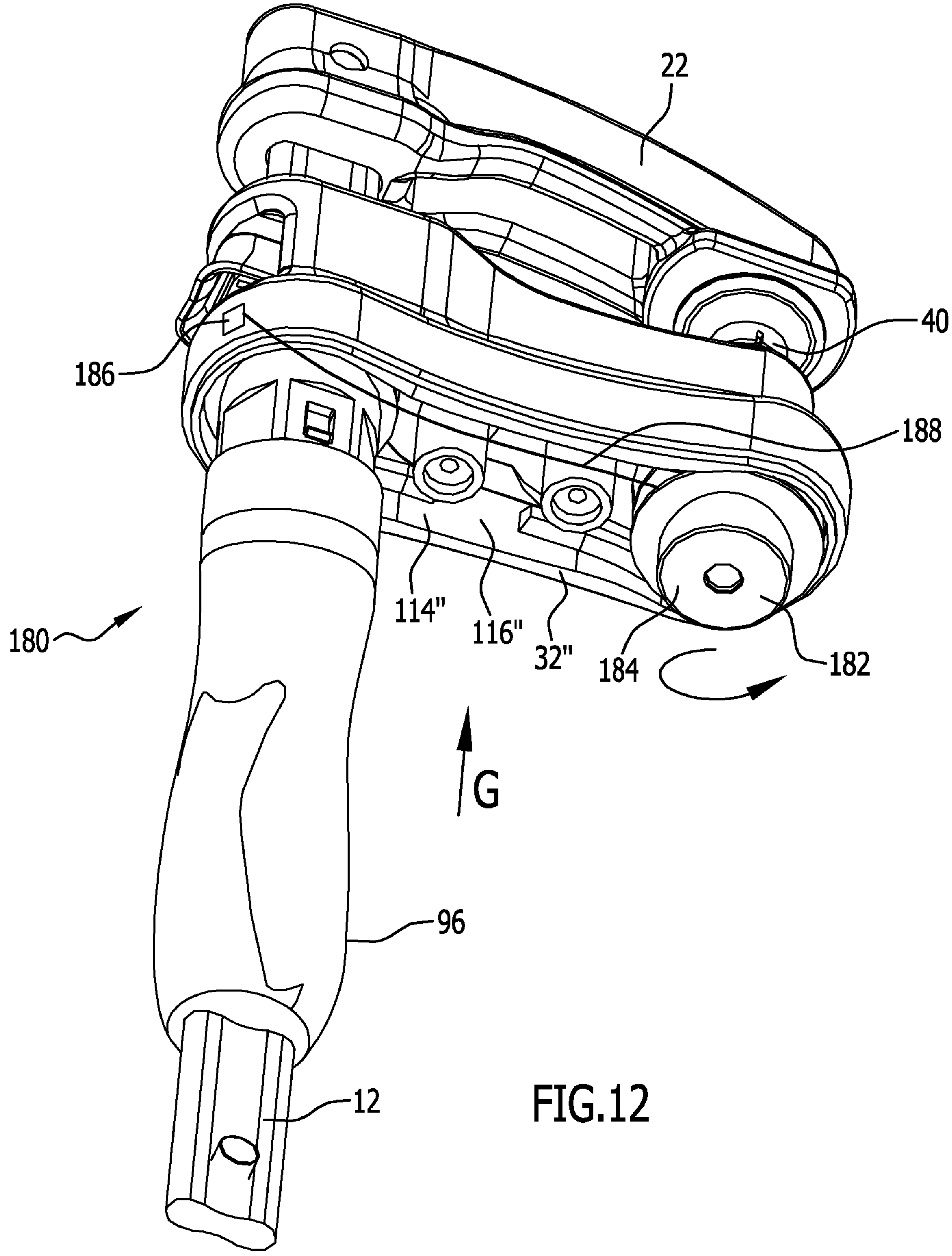
FIG. 12: is a perspective partial illustration (with open sliding jaw housing) of a third exemplary embodiment of a clamp according to the invention.
Figure 13:
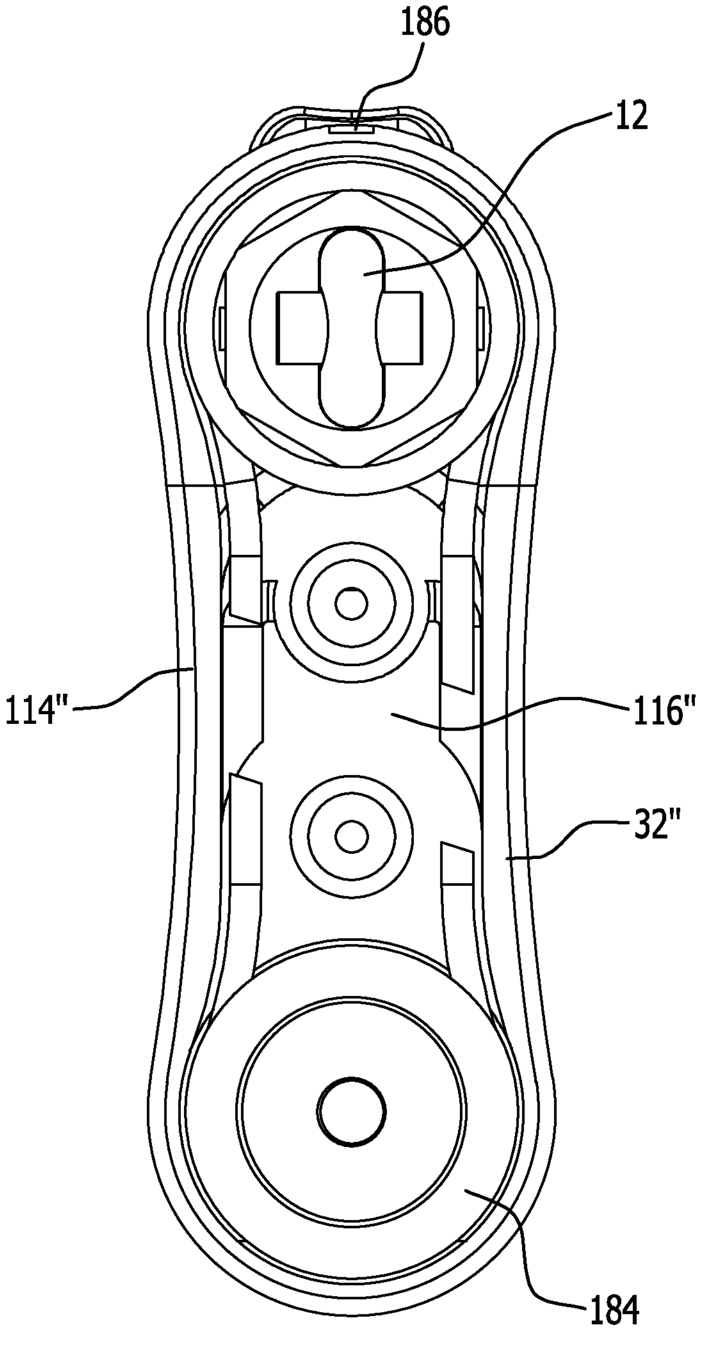
FIG. 13: is a view in the direction G of the clamp according to FIG. 12.

A third exemplary embodiment of a clamp according to the invention, which is shown in FIGS. 12 and 13 in a partial illustration and is denoted by 180, is formed identically to the clamp 10 in respect of the guide rail 12 and the fixed jaw 22. Like reference signs have been used for like elements.

A sliding jaw 32" is provided, which is formed identically to the sliding jaw 32 in respect of its fundamental construction.

This sliding jaw 32" has a housing 114" with a housing interior 116".

An electromotive drive 184 (an electric motor) is arranged in the housing interior 116" as a force application device 162. This drive is coupled to the spindle 40. The spindle can be displaced by means of this electromotive drive 184.

In particular, the electromotive drive 184 is coupled to a ball screw so as to be able to rotate the spindle 40.

A switch 186 is arranged on the sliding jaw 32". In this case, the switch is an electric switch. A conductive arrangement 188 leads from the switch 186 to a control device of the electromotive drive 184. This conductive arrangement 188 constitutes a connection, suitable for signal exchange, between the switch 186 and the control device of the electromotive drive 184 and thus of the electromotive drive 184. A coupling, suitable for signal exchange, between the switch 186 as actuation device and the force application device 162 is provided.

By actuating the switch 186, spaced from the spindle 40, the operator can control a displacement of the spindle 40, driven by means of the electromotive drive 184.

In one embodiment the housing interior 114' comprises a receptacle for one or more batteries for supplying power to the electromotive drive 184.

In the case of the clamp 180, a handgrip 96 is arranged on the sliding jaw 32". This handgrip 96 may be arranged rotatably on the sliding jaw 32" and comprise a rotary handle. wherein in particular a rotary position (relative to a rest position) is a switch position for a spindle displacement.

In the case of the clamp 180, there is no mechanical coupling in the sense of a drive-output coupling between the actuation device (the switch 186) and the spindle 40 or the force application device 182. The control of the displacement movement by means of the actuation device 186 is a signal-operative control without mechanical force transmission from the actuation device 186 to the force application device 182.

Otherwise, the clamp 180 functions as described above.

LIST OF REFERENCE SIGNS

10 clamp (first exemplary embodiment)
12 guide rail
14 longitudinal direction
16 first end
18 second end
20 recess
22 fixed jaw
24 fixing region
26 receptacle
28 contact element
30 contact face
32 sliding jaw
32' sliding jaw
32" sliding jaw
34 first guide device
36 direction of displacement of the sliding jaw
38 guide region
40 spindle
41 second guide device
42 longitudinal direction
44 pressure piece
46 first end
48 direction of displacement of the spindle
50 mounting region
52 contact face
54 axis of rotation
56 thread
58 counter thread
60 blocking device
62 brake element
64 cut-out
66 end
68 angular position
70 recess
72 pivot axis
74 basic position
76 plane
78 acute angle
80 spring device
82 support region
84 release element
86 upper side
88 direction of displacement
90 direction of displacement
92 direction of pivot
94 actuation device
96 handle
98 holding element
100 longitudinal direction
102 rotary bearing
104 axis of rotation
106 cut-out
108 transmission device

110 mechanical gearing device
112 force application device
114 housing
114' housing
114" housing
116 housing device
116' housing device
116" housing device
118 housing cover
120 screw
122 shaft element
124 cut-out
126 cut-out
128 region
130 gearwheel drive
132 first gearwheel
134 second gearwheel
136 sleeve
137 stop element
138 shoulder
140 third gearwheel
142 axis of rotation
144 fourth gearwheel
146 axis of rotation
160 clamp (second exemplary embodiment)
162 transmission device
164 first pulley element
166 second pulley element
168 belt, chain
180 clamp (third exemplary embodiment)
182 force application device
184 electromotive drive
186 switch (actuation device)
188 conductive arrangement

What is claimed is:

1. A clamp, comprising:
a guide rail;
a fixed jaw, which is arranged on the guide rail;
a sliding jaw, which is displaceable on the guide rail;
a handgrip directly connected to the sliding jaw and comprising a cylindrical holding element, the handgrip being positioned on a bottom end of the sliding jaw;
at least one spindle, which is arranged displaceably on the sliding jaw and on which there is arranged or formed a pressure piece, the at least one spindle being positioned on a top end of the sliding jaw;
an actuation device, which is spaced from the at least one spindle, which is positioned on the bottom end of the sliding jaw, and which is actuable by an operator in order to control a displacement movement of the at least one spindle;
a force application device, which acts on the at least one spindle and by means of which a displacement movement of the at least one spindle is driven and which is or comprises an electromotive drive for the at least one spindle, a hydraulic drive for the at least one spindle, or a pneumatic drive for the at least one spindle, and a transmission device, which connects the actuation device and the force application device;
wherein:
the force application device is arranged on the sliding jaw and is displaceable with the sliding jaw;
the guide rail is guided through the handgrip; and
one-handed operation is possible, in which a displacement movement of the at least one spindle is achievable controlled by the actuation device by a holding hand of the operator, by means of which the clamp is held.

2. The clamp according to claim 1, wherein the transmission device provides a signal-operative coupling between the actuation device and the force application device and control signals are transmitted by the transmission device.

3. The clamp according to claim 1, wherein the actuation device comprises a switch or is a switch.

4. The clamp according to claim 1, wherein the sliding jaw comprises a housing with a housing interior, and wherein the force application device is arranged in the housing interior.

5. The clamp according to claim 4, wherein the housing interior comprises a receptacle for one or more batteries.

6. The clamp according to claim 4, wherein the housing is closed.

7. The clamp according to claim 1, wherein the force application device comprises the electromotive drive which is coupled to the spindle.

8. The clamp according to claim 1, wherein the transmission device connects the actuation device and the force application device to one another in signal-transmitting manner.

9. The clamp according to claim 1, wherein the actuation device is arranged on the sliding jaw and is displaceable with the sliding jaw.

10. The clamp according to claim 1, wherein the sliding jaw comprises a housing with a housing interior, and wherein the force application device and the transmission device are arranged at least in part in the housing interior.

11. The clamp according to claim 1, wherein the at least one spindle is mounted rotatably on the sliding jaw.

12. The clamp according to claim 11, wherein the at least one spindle is a screw spindle, which is mounted rotatably by a thread on a counter thread of the sliding jaw.

13. The clamp according to claim 1, wherein there is arranged on the sliding jaw a first guide device for guiding the sliding jaw on the guide rail, and wherein there is arranged on the sliding jaw, a second guide device for guiding the at least one spindle on the sliding jaw.

14. The clamp according to claim 13, wherein the first guide device and the second guide device are spaced from one another.

15. The clamp according to claim 1, wherein a direction of displacement of the displaceability of the sliding jaw on the guide rail and a direction of displacement of the displaceability of the at least one spindle on the sliding jaw are parallel to one another.

16. The clamp according to claim 1, wherein:
the handgrip comprises a rotary handle; and
a rotary position of the rotary handle relative to a rest position of the rotary handle is a switch position for the displacement movement of the at least one spindle.

17. The clamp according to claim 16, wherein the rotary handle is displaceable with the sliding jaw.

18. The clamp according to claim 16, wherein the rotary handle comprises the cylindrical holding element, which extends in a longitudinal direction and can be grasped by the holding hand of the operator.

19. The clamp according to claim 16, wherein the rotary handle is arranged and configured such that a displacement movement of the sliding jaw on the guide rail is actuable by the switch position of the rotary handle.

20. The clamp according to claim 1, wherein a contact element is arranged or formed on the fixed jaw, and the pressure piece of the at least one spindle is arranged such that a projection of the pressure piece with a direction of projection parallel to a direction of displacement of the at least one spindle abuts the contact element.

21. The clamp according to claim 1, comprising a blocking device for blocking the displaceability of the sliding jaw on the guide rail at least in one direction.

22. The clamp according to claim 21, wherein the blocking device is formed such that a movement of the sliding jaw away from the fixed jaw is blockable and a movement of the sliding jaw towards the fixed jaw is permitted.

23. The clamp according to claim 21, wherein the blocking device comprises at least one brake element, which has at least two different angular positions relative to the guide rail.

24. The clamp according to claim 21, comprising a release element for releasing a blocking which is operable with the holding hand of the operator, with which the clamp is held.

* * * * *